United States Patent
Saini et al.

(10) Patent No.: US 9,942,117 B1
(45) Date of Patent: Apr. 10, 2018

(54) METRIC ANOMALY DETECTION IN A DIGITAL MEDIUM ENVIRONMENT

(71) Applicant: Adobe Systems Incorporated, San Jose, CA (US)

(72) Inventors: Shiv Kumar Saini, Bangalore (IN); Ritwik Sinha, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/414,160

(22) Filed: Jan. 24, 2017

(51) Int. Cl.
*H04Q 1/20* (2006.01)
*H04L 12/26* (2006.01)
*H04L 12/24* (2006.01)

(52) U.S. Cl.
CPC ........ *H04L 43/067* (2013.01); *H04L 41/5038* (2013.01)

(58) Field of Classification Search
CPC ............ H04B 17/0065; H04B 17/0042; H04L 63/1416; H04L 63/145; H04W 12/10
USPC .................................. 375/228, 224; 707/722
See application file for complete search history.

(56) References Cited

U.S. PATENT DOCUMENTS

| | | | | |
|---|---|---|---|---|
| 2010/0185499 | A1* | 7/2010 | Dwarakanath | G06Q 10/04 705/7.31 |
| 2012/0117254 | A1* | 5/2012 | Ehrlich | H04L 41/142 709/228 |
| 2016/0358065 | A1* | 12/2016 | Gedge | G06N 3/006 |
| 2017/0076202 | A1* | 3/2017 | George | H04L 41/142 |

* cited by examiner

*Primary Examiner* — Khai Tran
(74) *Attorney, Agent, or Firm* — Wolfe-SBMC

(57) ABSTRACT

Metric anomaly detection techniques in a digital medium environment are described. An input time interval is identified by an analytics system for the presence of an anomaly of a metric. Inclusion of a scheduled event in the input time interval is identified, and a historical time interval is determined that also includes the scheduled event. Usage data describing values of the metric is then obtained for both the input time interval and the historical time interval. The usage data corresponding to the input time interval is then compared with the usage data corresponding to the historical time interval to detect effects of the scheduled event and whether the input time interval includes an anomaly in the metric.

20 Claims, 5 Drawing Sheets

November 1 - December 5 2012/2013

November 4 - November 29, 2012
November 10 - December 5, 2013
(Dates Adjusted)

METRIC ANOMALY DETECTION IN A DIGITAL MEDIUM ENVIRONMENT

BACKGROUND

Analytics systems have been developed to collect and analyze large sets of data to identify trends, patterns, and correlations in the data that are not readily observable by humans due to the amount of data. In one example of analysis performed by an analytics system, a variety of additional insights are gained into operation of a service provider system within a digital medium environment, such as a web service, online provider of goods and services, and so forth. In a digital marketing scenario, for instance, this may be used to identify segments (e.g., subsets) of a user population in order to target digital marketing content to increase a likelihood of conversion. Other examples include insights into computational resource consumption by the service provider system, tracking of expenses and revenue, number of visitors to a web service, page views, and so forth.

Conventional analytics systems support a variety of techniques by which a user may interact with the data in order to gain access to this insight provided by the analytics system, such as to evaluate values of different metrics described in the analytics data via a user interface. A user, for instance, may interact with the user interface of the analytics system to view different combinations of metrics that have been associated by the system, values of those metrics, trends exhibited by the values of those metrics and correlated metrics, and so on. However, conventional analytics systems do not accurately account for scheduled events such as holidays or campaigns when considering whether a particular deviation from typical data for a metric is an anomaly. Consequently, conventional analytics systems provide a limited ability, if at all, to gain insight into the effects of scheduled events on the values of these metrics.

SUMMARY

Metric anomaly detection techniques in a digital medium environment are described in which the effects of scheduled events in multiple time intervals are compared for a metric involving provision of digital content by a service provider system. In this way, insight may be gained into whether deviations from typical data for a metric are a result of the scheduled event or an anomaly, and reduce the number of false-positive anomaly alerts presented to users.

In one example, an input time interval is identified by an analytics system for the presence of an anomaly of a metric. The input time interval may be a day, week, month, quarter-year, half-year, year, or any other time interval, including custom time intervals selected by a user. Inclusion of a scheduled event in the input time interval is identified by the analytics system, such as a holiday, a sale campaign, a sporting event, or a concert, to name a few examples. After identifying the scheduled event, a historical time interval is determined by the analytics system that also includes the scheduled event. The historical time interval can be the same amount of time as the input time interval, but from a different day, week, month, year, or other period of time, so that the input time interval can be compared to the historical time interval.

Usage data describing values of the metric is then obtained by the analytics system for both the input time interval and the historical time interval. The usage data describes values of the metric involved in the provision of the digital content by a service provider system, such as traffic, computational resource consumption, sales, and so forth.

The usage data corresponding to the input time interval is then compared by the analytics system with the usage data corresponding to the historical time interval to detect whether the input time interval includes an anomaly in the metric. For example, consider a deviation from typical data behavior for the metric is detected in the data for the input time interval the day before a holiday. Data for the metric from the historical time period can be analyzed on the day before the holiday to determine if the data from the input time interval is an anomaly, or is the result of an effect of the holiday even though the deviation from typical data behavior did not occur on the date of the holiday. The result of the comparison detection can then be output by the analytics system, e.g., in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
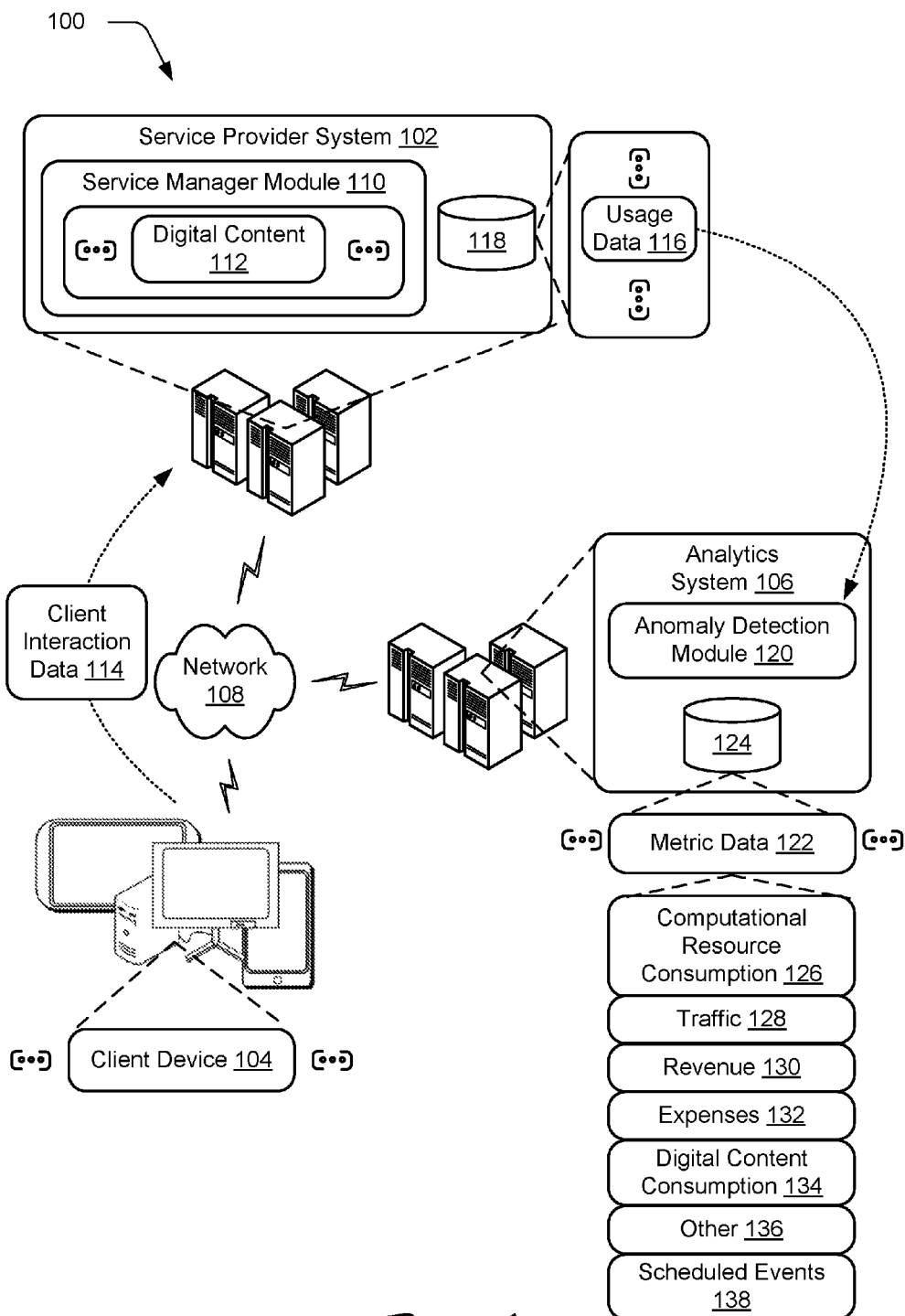
FIG. 1 is an illustration of an environment in an example implementation that is operable to employ metric anomaly detection techniques described herein.

Analytics systems may be used to give a variety of insights in to operation of a service provider system based on correlations, trends, and patterns exhibited by data collected from the service provider system. Conventional analytics systems, however, provide very limited insight on possible causes when a metric deviates from typical behavior. Often, false positives are detected by conventional analytics systems due to deviations from typical behavior for a metric that are classified as anomalies when in fact the deviation from typical behavior is the result of a scheduled event. Conventional analytics systems experience difficulties in trying to tie a deviation from typical behavior for a metric, however, because the deviation may occur on a different day or at a different time than the scheduled event, different metrics are affected differently by different scheduled events, and so forth. Because conventional techniques do not account for these different scenarios, users are left with inaccurate and incomplete analyses of metrics of their service provider systems.

Accordingly, metric anomaly detection techniques and systems in a digital medium environment are described in which user data is compared to both scheduled events and historical user data to detect anomalies for metrics involving provision of digital content by a service provider system. The service provider system, for instance, may be configured to provide digital content as an online application (e.g., for subscription based access), provide opportunities to purchase a good or service, online storage, or other web service that is accessible via a network.

Operation of the service provider system in providing this access to the digital content may be described in usage data using a variety of metrics and values of those metrics. Metrics include any characteristic that may be described in the operation of the service provider system to provide the digital content for access via the network. Examples of metrics include computational resource consumption (e.g., storage, network, or processing), traffic (e.g., a number of visitors, page views), revenue, expenses, conversion rate, and so forth.

A variety of techniques may be employed by an analytics system to detect anomalies of metrics. In one example, the analytics system employs disjoint (i.e., non-continuous) sets of the usage data based on a level of temporal granularity to be used for detection of anomalies. Examples of different levels of temporal granularity (i.e., intervals of time) include hourly, daily, weekly, monthly, quarterly, yearly, and so forth.

In order to provide a better understanding of metric anomaly detection, consider the following example. A user has undertaken a task of evaluating metrics related to sales for an online service provider during the holiday season from November 1 through December 31. The user may select different metrics via interaction with a user interface of an analytics system of the service provider to observe trends exhibited by usage data of the service provider, correlations between metrics, values of those metrics, and so forth. The user may also select an input time interval such as the dates for the holiday season from November 1 through December 31 in order to evaluate the effects of holidays and sales events that took place during this time period on the selected metric. The user may also wish to be alerted to any days that may be anomalies during this time period, but does not want scheduled events such as holidays and sales events to cause unnecessary anomaly alerts.

After identifying the input time interval, a computing device of the analytics system identifies inclusion of one or more scheduled events that occur during the input time interval. The scheduled events can be identified via publicly available calendars or event listings, or may be identified through private lists that are specific to the service provider. Continuing with the above example, the computing device may identify Thanksgiving and Christmas as holidays during the input time period from a publicly available calendar. The computing device may also identify the occurrence of a sales event specific to the service provider that occurs the first weekend of November from a private database available to the analytics system.

The analytics system then determines at least one historical time interval that includes the scheduled event in the input time interval. In the same example from above, the analytics system can determine a historical time interval from November 1 through December 31 from the year previous to the input time interval. The historical time interval may be temporally disjoint (i.e., non-continuous) with the input time interval. As discussed in greater detail below, additional days may be included although not analyzed for anomalies in the time series model described herein. In this scenario, if a user wants to detect anomalies from November 1 through December 31, data from January 1 to September 26 would not be included between the input time interval and the historical time interval. The historical time interval may also modify the dates of the input time interval in order to include scheduled events. For example, if the sales event specific to the service provider occurred during the last weekend of October in the historical time interval, this weekend may be included in the historical time interval despite not occurring during the date range of the input time interval. In this way, time intervals are compared based on an increased likelihood of accurately reflecting similar situations encountered by the service provider system and thus increases a likelihood of accuracy in anomaly detection.

When the input time interval and the historical time interval are determined, the analytics system then obtains usage data describing values of the metric involving the provision of the digital content by the service provider system for both of the time intervals. The usage data corresponding to the input time interval and corresponding to the historical time interval serve as a basis to determine whether any values of the metric during the input time interval are the result of one of the scheduled events, or are an anomaly. In this way, usage data is employed that has an increased likelihood of accurately describing the interval of time under consideration by the analytics system. This results in an increase in accuracy of the analytics system in determining the effects of scheduled events and anomalies of a metric by ignoring usage data that could lead to inaccuracies (e.g., data from the intervening months between the input time interval and the historical time interval), reduces computational resource consumption by the analytics system, and may support real-time determinations of anomalies.

The analytics system, for instance, then detects whether the input time interval includes an anomaly of the metric by comparing the usage data corresponding to the input time interval with the usage data corresponding to the historical time interval. Considering the example above, the analytics system may detect that the day following Christmas saw a dramatic increase in the metric during the historical time interval. Even though the day following Christmas (December 26) is not considered to be a holiday on many publicly-available calendars, the analytics system may employ a threshold number of days surrounding a holiday on a calendar that may be affected by the holiday. Then when considering whether the day after Christmas is an anomaly in the input time interval, the analytics system can compare the usage data from December 26 in the input time interval to December 26 in the historical time interval. If the metric values for the two time intervals are similar on or near the same day surrounding the holiday, then the analytics system can classify the departure from typical sales data as an effect of the holiday rather than an anomaly.

Similarly, the analytics system can be used to interpret the effect of a holiday that does not occur on the same date each year when detecting anomalies. In the same example, many service providers are affected by heavy traffic the day after Thanksgiving, otherwise known as Black Friday. This is another instance of a day that can carry the effect of a holiday without occurring on the same day as the holiday. However, Black Friday occurs on a different date from one year to the next. Thus, the analytics system can use a combination of the known scheduled events from the publicly-available calendar and the threshold number of days surrounding a holiday to accurately compare the usage data between the two time intervals. In considering whether the day after Thanksgiving is an anomaly in the input time interval, the analytics system can compare the usage data from the day after Thanksgiving in the input time interval to the day after Thanksgiving in the historical time interval. Even though Black Friday occurs on different dates from one year to the next, the analytics system can still accurately determine whether the departure from typical sales data is an effect of the holiday rather than an anomaly. Further, the analytics system can prevent false positive anomaly alerts that are actually the result of a scheduled event and accurately alert users of anomalies that do occur.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Term Examples

"Digital content" is any content that may be stored digitally or electronically, e.g., movies, books, documents, games, applications, images, audio files, and so on. Digital content may also comprise an application, web service, and so forth and thus different interactions with the digital content (e.g., a user interface of the digital content) also correspond to different actions, e.g., selection of a link, an item in a user interface, and so forth.

"Anomaly" is data that deviates from what is standard, normal or expected for the data.

"Metric" is any characteristic that may be described in the operation of the service provider system to provide the digital content for access via the network. Examples of metrics include computational resource consumption (e.g., storage, network, or processing), traffic (e.g., a number of visitors, page views), revenue, expenses, conversion rate, and so forth.

"Scheduled event" is any occurrence that is included in or planned according to a schedule. A scheduled event may be an event available on a publicly accessible calendar, such as a holiday or an event like lunch time. A scheduled event may also be "private" in the sense that the scheduled event is specific to a service provider and is therefore not necessarily present on a publicly accessible calendar, e.g., based on heuristics. Private scheduled events can include events such as sales, sporting events, concerts, grand opening events, and so forth.

"Input time interval" is an amount of time indicated by a user or computing device during which a metric can be evaluated. An input time interval may be a day, week, month, quarter-year, half-year, year, or any other time interval, including custom time intervals selected by a user.

"Historical time interval" is the same or similar amount of time as an input time interval, but from a different day, week, month, year, or other period of time, so that usage data from the input time interval for one or more metrics can be compared to usage data from the historical time interval for the one or more metrics.

"Usage data" is a description of a variety of metrics and values of those metrics for a service provider. Usage data may describe interactions of a client device with the digital content, for example. This may be reflected as a number of visitors, page views, and so forth.

Example Environment

FIG. 1 is an illustration of a digital medium environment 100 in an example implementation that is operable to employ metric anomaly detection techniques described herein. The illustrated environment 100 includes a service provider system 102, a client device 104, and an analytics system 106 that are communicatively coupled, one to another, via a network 108. Computing devices that implement the service provider system 102, the client device 104, and the analytics system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider and analytics systems 102, 106 and as further described in FIG. 5.

The service provider system 102 is illustrated as including a service manager module 110 that is implemented at least partially in hardware of a computing device. The service manager module 110 is configured to manage online interaction of the client device 104 with digital content 112 of the service provider system 102 via the network 108. As previously described, the digital content 112 may take a variety of forms, such as an online application, online storage, web service, digital images, digital audio, multimedia, and so forth. Thus, client interaction data 114 communicated via the network 108 involving interaction with the digital content 112 by the client device 104 via the network 108 may also take a variety of forms, such as selection of a menu item, voice command, gesture, selection of a hyperlink, and so forth.

A user of client device 104, for instance, may create the digital content 112 by accessing the service manager module 110 via the network 108, such as to create an illustration, movie, audio data, and so forth. This may include execution of applications locally by the client device 104 and remotely by the service provider system 102 that both involve actions taken with respect to the digital content 112. As part of this, a user of the client device 104 may initiate operations involving interaction with the digital content 112, such as to draw a line, color a shape, enter text, and so forth. Thus, initiation of these operations is considered performance of an action involving interaction with the digital content 112. Other examples are also contemplated in which the digital content 112 is an application, web service, and so forth and thus different interactions with the digital content 112 (e.g., a user interface of the digital content 112) also correspond to different actions, e.g., selection of a link, an item in a user interface, and so forth.

The service manager module 110 is configured to generate usage data 116, illustrated as stored in storage 118, that describes provision of the digital content 112 that supports this interaction. The usage data 116, for instance, may describe interactions of the client device 104 with the digital content 112 as described above. This may be reflected as a number of visitors, page views, and so forth. The usage data 116 may also describe operation of the service provider system 102 performed in the provision of the digital content 112, such as hardware resources (e.g., processing system, computer-readable storage media, network), software resources, revenue collected, expenses occurred, and so forth.

The usage data 116 is this example is then collected by the analytics system 106 via the network 108. The analytics system 106 includes an anomaly detection module 120 that is implemented at least partially in hardware of a computing device (e.g., a processing system and computer readable storage medium) to generate metric data 122 from the usage data 116, which is illustrated as stored in storage 124. The metric data 122 is configured to detect anomalies for metrics involving provision of the digital content 112 by the service provider system 102.

The metric data 122, for instance, may be configured to detect anomalies in values of computational resource consumption 126 by the service provider system 102. Computational resource consumption 126 may include an amount of processing (e.g., servers, cores, CPUs), memory (e.g., RAM, persistent storage), network (e.g., bandwidth, spikes) resources used by the service provider system 102. In another example, the metric data 122 includes traffic 128 to the service provider system 102, such as number of visitors, page views, and so on. The metric data 122 may also take into account financial considerations of the service provider system 102 in providing the digital content 112, such as revenue 130 and expenses 132. In another example, the metric data 122 includes digital content consumption 134, such as number of downloads, interactions, which items of digital content 112 are viewed (e.g., videos, web pages), how this interaction occurs (e.g., stream, download, browser, mobile application), and so forth. Other 136 examples of metrics that may be analyzed for anomalies by the anomaly detection module involving provision of the digital content 112 by the service provider system 102 are also contemplated, including metrics describing users and user devices that interact with the digital content 112, including demographics, product descriptions, and so forth. In implementations, the metric data 122 can also include scheduled events 138, including events specific to the service provider such as sales, sporting events, or concerts, but may also include publicly available scheduled events like holidays. The anomaly detection module 120 may generate and utilize this metric data 122 in a variety of ways, an example of which is described in greater detail in the following discussion and is shown in a corresponding figure.

Figure 2:
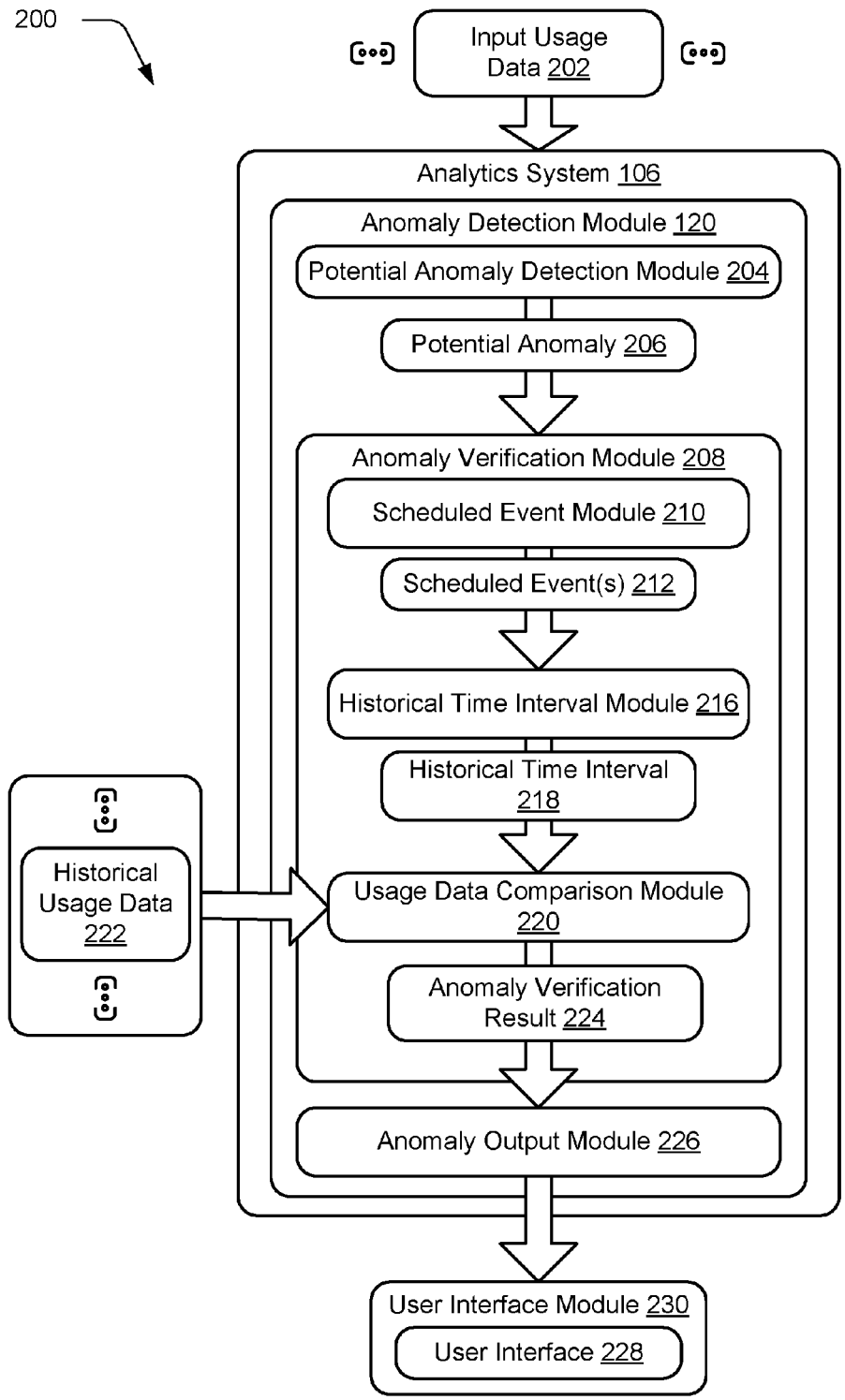
FIG. 2 depicts a system in an example implementation showing operation of an anomaly detection module of FIG. 1 in greater detail.

FIG. 2 depicts a system 200 in an example implementation showing operation of the anomaly detection module 120 of FIG. 1 in greater detail. To begin in this example, input usage data 202 is received by an anomaly detection module 120. A user of the analytics system 106, for instance, may interact with a user interface of the analytics system 106. The user interface is configured to support a flexible reporting and analytics work space in which a user may interact with usage data 116 that describes values of metrics involving provision of the digital content 112 by the service provider system 102.

The user interface, for instance, may be configured to output correlations, trends, and patterns exhibited by values of metrics of the usage data 116, which may be learned automatically and without user intervention by the analytics system 106 or based on manual inputs from a user, at least in part. In this example, the input usage data 202 describes a subset of the usage data 116, with which, a user interacts via the user interface and thus is identified automatically and without user intervention by the analytics system 106. Other examples are also contemplated, such as to obtain the input usage data 202 as corresponding to a search query that specifies terms to be used as a basis of a forecast, e.g., a time interval, metrics, and so forth. A user, for instance, may input a search query (e.g., website traffic during Christmas) and in response the analytics system 106 may obtain input usage data 202 from the usage data 116 that corresponds to this search query as well as any other historical usage data as further described below. As previously described, the input usage data 202 describes values of at least one metric involved in the provision of the digital content 112 by the service provider system 102.

The input usage data 202 is then processed by a potential anomaly detection module 204. The potential anomaly detection module 204 is implemented at least partially in hardware of a computing device (e.g., a processing system and computer-readable storage medium) to detect potential anomalies in the input usage data 202. The potential anomaly detection module 204 applies thresholds and/or statistical analyses to the input usage data 202 to identify any points in time that deviate from typical behavior for a metric represented by the input usage data. For example, the potential anomaly detection module 204 can apply thresholds that consider changes in input usage data values from a weekday to a weekend-day as typical behavior for a metric, rather than a deviation from typical behavior. In another example, the potential anomaly detection module 204 can apply thresholds that consider changes in input usage data values during "lunch time" versus morning and afternoon hours as typical behavior for a metric, rather than a deviation from typical behavior. The potential anomaly detection module 204 can apply different thresholds and/or statistical analyses on a metric-by-metric and time interval-by-time interval basis depending on the particular scenario to identify potential anomalies in the input usage data 202. However, input usage data 202 that falls outside of the threshold values is indicated as a potential anomaly 206.

An anomaly verification module 208 receives data describing the potential anomaly 206 and the input usage data 202 as inputs. The anomaly verification module 208 is implemented at least partially in hardware of a computing device (e.g., a processing system and computer-readable storage medium) to verify whether the potential anomaly is in fact an anomaly of the input usage data 202. In order to verify whether the potential anomaly is an anomaly of the input usage data 202, the anomaly verification module 208 includes a scheduled event module 210. The scheduled event module 210 is configured to identify the inclusion of a scheduled event in the input usage data 202. As discussed above, a scheduled event may be an event available on a publicly accessible calendar, such as a holiday or an event like lunch time. The scheduled event may also be "private" in the sense that the scheduled event is specific to the service provider and is therefore not necessarily present on a publicly accessible calendar, e.g., based on heuristics. Private scheduled events can include events such as sales, sporting events, concerts, grand opening events, and so forth.

The scheduled event module 210 identifies the inclusion of a scheduled event by comparing dates and/or times of scheduled events to a time interval of the usage data 202. A scheduled event 212 identified during the time interval of the usage data 202 is then provided to a historical time interval module 216 of the anomaly verification module 208. The historical time interval module 216 determines a historical time interval 218 that includes the scheduled event 212. The historical time interval 218 can be a same duration as the time interval of the input usage data 202, and/or can have a same start time and end time as the input usage data. Alternatively, the historical time interval 218 may be a different duration, have a different start time, and/or a different end time than the time interval of the usage data 202. For example, the scheduled event 212 may occur on a date or at a time in the historical time interval 218 that falls outside of the time interval of the usage data 202. Generally, the historical time interval 218 does not overlap the time interval of the usage data 202, so that usage data from the historical time interval 218 can be compared to the input usage data 202 as described below.

A usage data comparison module 220 of the anomaly verification module 208 receives the input usage data 202, the scheduled event 212, and the historical time interval 218. The usage data comparison module 220 also obtains historical usage data 222. The historical usage data 222, like the input usage data 202, describes a subset of the usage data 116 but corresponds to the determined historical time interval 218 that includes the scheduled event 212. Also similar to the input usage data 202, the historical usage data describes values of at least one metric involved in the provision of the digital content 112 by the service provider system 102.

The usage data comparison module 220 is configured to compare the input usage data 202 with the historical usage data 222 while taking into consideration the scheduled event 212. To do so, the input usage data 202 that was indicated as a potential anomaly 206 is compared to the historical usage data 222. This can include comparing the input usage data 202 indicated as the potential anomaly 206 to historical usage data 222 from the same date or time from the historical time interval 218. If the input usage data 202 indicated as the potential anomaly 206 deviates from typical behavior for the metric on the same date or at the same time, it is unlikely that the potential anomaly is in fact an anomaly. The usage data comparison module 220 can output an anomaly verification result 224 indicating that the potential anomaly 206 is not, or is likely not, and anomaly.

However, situations exist where the input usage data 202 indicated as a potential anomaly 206 does not deviate from typical behavior for the metric on the same date or at the same time as the historical usage data 222 of the historical time interval 218. In one or more implementations, the usage data comparison module 220 then compares the input usage data 202 indicated as the potential anomaly 206 with the historical usage data 222 on the date or at the time of the scheduled event 212.

Consider an example in which the potential anomaly 206 occurs on the same date or at the same time as the scheduled event 212 during the time interval of the input usage data 202, such as Labor Day. Labor Day is observed on the first Monday of September, which causes the date of observance to vary from one year to the next. If the potential anomaly 206 occurs on Labor Day, the input usage data 202 will not correspond to the historical usage data 222 on the same date in historical time interval 218.

However, the usage data comparison module 220 identifies the correspondence between the potential anomaly 206 and the scheduled event 212—Labor Day in this example. The usage data comparison module 220 then compares the historical usage data 222 for the scheduled event 212 during the historical time interval 218 to the input usage data 202 indicated as the potential anomaly 206. In other words, the usage data comparison module 220 compares Labor Day data to Labor Day data, regardless of the date on which Labor Day occurred during the two time intervals. If the usage data 202 indicated as the potential anomaly 206 deviates from the historical usage data 222 on the scheduled event 212 by an amount that is considered significant, then an anomaly verification result 224 can be output indicating that the potential anomaly 206 is an anomaly. If the usage data 202 indicated as the potential anomaly 206 does not deviate from the historical usage data 222 on the scheduled event 212 by an amount that is considered significant, then an anomaly verification result 224 can be output indicating that the potential anomaly 206 is not an anomaly.

Even with the above considerations taken by the usage data comparison module 220, some situations exist in which a scheduled event will affect metrics outside of the time duration of the scheduled event. For example, a scheduled sale event may affect a metric during the sale event, but a scheduled sporting event may affect a metric before the sporting event occurs when users are buying tickets to the sporting event. In this scenario, the usage data comparison module 220 can compare the historical usage data 222 surrounding the scheduled event 212 during the historical time interval 218 to the input usage data 202 indicated as the potential anomaly 206. A predetermined time period surrounding the scheduled event 212 may be set to allow for usage data occurring outside of the time set for the scheduled event to be considered "affected" by the scheduled event 212.

Consider an example in which the potential anomaly 206 does not occur on the same date as the scheduled event 212, but does occur near the scheduled event, such as Black Friday following Thanksgiving. As discussed above, Black Friday may not appear on publicly accessible calendars as a holiday, and may also not be listed as a private scheduled event as described above. Furthermore, Black Friday does not occur on the same date from one year to the next, so comparisons of dates from year to year will not yield accurate indications on whether data of metrics on Black Friday are anomalies or not.

In implementations, the usage data comparison module 220 compares the historical usage data 222 surrounding the scheduled event 212 during the historical time interval 218 to the input usage data 202 indicated as the potential anomaly 206. In the Black Friday example, the usage data comparison module 220 may use a predetermined time period of 4 days surrounding the scheduled event of Thanksgiving during the historical time interval 218 when comparing usage data. Using a predetermined time period of four days captures days that are affected by the Thanksgiving holiday, but may not fall on the holiday itself. Although four days is used in this example, other time periods are also contemplated, especially when working in other time granularities such as weeks or hours.

The usage data comparison module 220 then identifies that the potential anomaly 206 occurs within the predetermined time period. The usage data comparison module 220 can then accurately compare the usage data 202 that indicated the potential anomaly 206 to historical usage data 222 occurring in the predetermined time period surrounding the scheduled event 212 in the historical time interval 218. In the Black Friday example, this will ensure that usage data 202 will be compared with historical usage data 222 on Black Friday for both time intervals, even though Black Friday may not be a scheduled event and does not occur on the same date year to year. If the usage data 202 indicated as the potential anomaly 206 deviates from the historical usage data 222 surrounding the scheduled event 212 by an amount that is considered significant, then an anomaly verification result 224 can be output indicating that the potential anomaly 206 is an anomaly. If the usage data 202 indicated as the potential anomaly 206 does not deviate from the historical usage data 222 surrounding the scheduled event 212 by an amount that is considered significant, then an anomaly verification result 224 can be output indicating that the potential anomaly 206 is not an anomaly. In this way, time intervals are compared based on an increased likelihood of accurately reflecting similar situations encountered by the service provider system and thus increases a likelihood of accuracy in anomaly detection.

The anomaly verification result 224 may be leveraged in a variety of ways, such as for load balancing of computational resources, targeting of digital marketing content, inventory control, and so forth. The anomaly verification result 224 for instance, may be leveraged automatically and without user intervention by the analytics system 106 or output in a user interface 228 by a user interface module 230, e.g., as a notification, in real time during user interaction with the usage data. For example, when a potential anomaly 206 is verified by the anomaly verification module 208 as an anomaly of the input usage data 202, an alert can be output in the user interface 228 to alert users to the presence of an anomaly. Other examples are also contemplated, such as comparisons in the user interface 228 between the effects of different scheduled events, alerts presented in the user interface 228 when metrics increase or fall short of previous metrics for the same scheduled event, and so forth.

Figure 3:
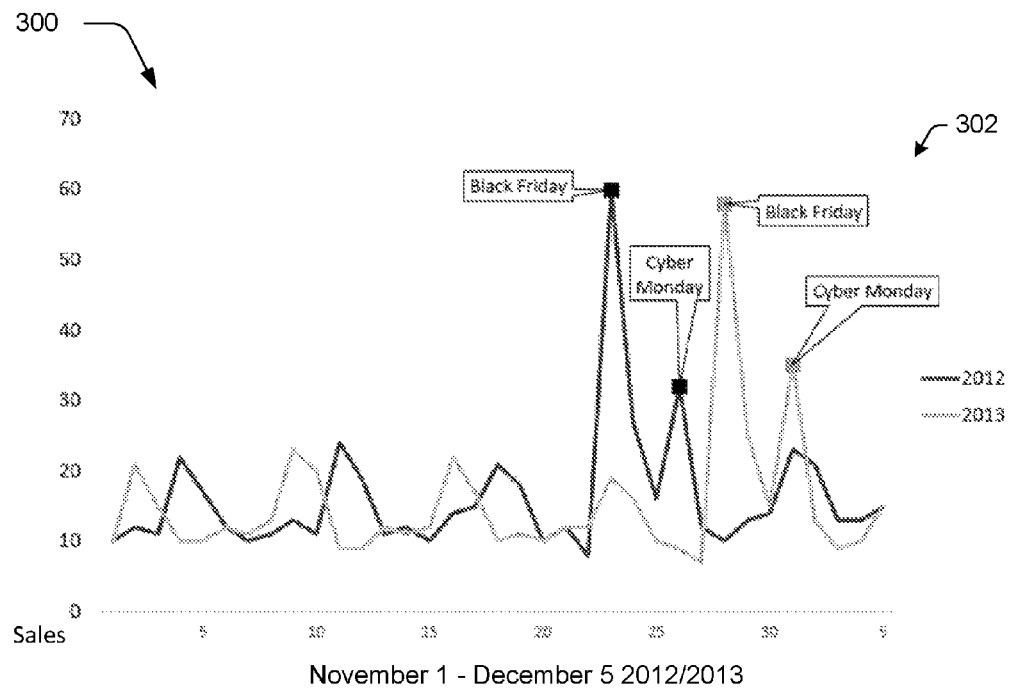
FIG. 3 depicts an example output of an analytics system configured to implement metric anomaly detection techniques as described herein.
Figure 3:
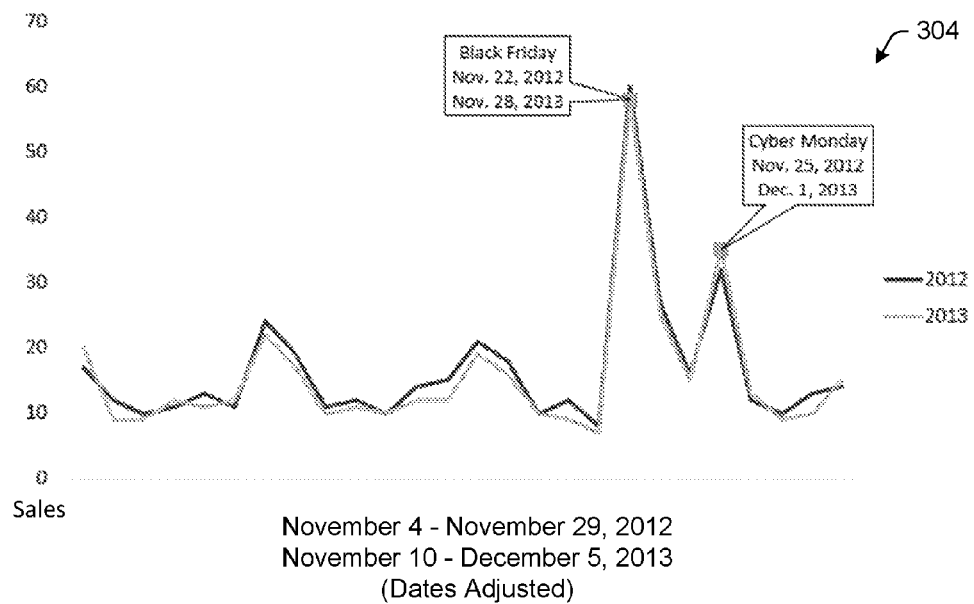

FIG. 3 depicts an example implementation of metric anomaly detection applied to a sales metric in a digital medium environment, generally at 300. The diagram at 302 illustrates a number of sales (y-axis) during a time interval (x-axis) from November 1 through December 5 for two different years 2012 and 2013. In 2012, Black Friday occurred on November 22, and Cyber Monday occurred on November 25. In 2013, Black Friday occurred on November 28, and Cyber Monday occurred on December 1. Without any correction for the different dates of the events depicted in the diagram at 302, it is likely that the deviation from the normal behavior of the sales metric will result in the indication of an anomaly for these dates. However, the deviation from normal behavior is actually consistent from year to year. Therefore, the anomaly indication will be inaccurate and cause frustration for users.

In order to correct for the different dates of the affected metric, consider the following example algorithms which may be used singularly or in combination, and with any of the techniques described herein. First, a value of the metric at time t is given by $y_t$. The value $y_t$ at any given time can be influenced by a number of factors. In this example, the value $y_t$ on a particular day can be influenced by the day of the week and whether the particular day occurs on or near a scheduled event:

$$y_t = yw_t + yh_t$$

Where $yw_t$ represents the influence of the value by the day of the week and $yh_t$ represents the influence of the value by the scheduled event. In order to generate accurate values for $y_t$ at a given time, the value for $yh_t$ must also be accurate. Thus, effects of the scheduled event on or around the scheduled event must be determined, and year-over-year time intervals aligned correctly based on the effects of the scheduled event.

To determine $yh_t$, consider again the example 300, where data from the 2012 year during the given time interval is considered as historical usage data and data from the 2013 year is considered input usage data. An anomaly detection algorithm is run on the historical and input usage data to determine the effects of scheduled events on the input usage data. The first portion of the algorithm queries data, including a database of scheduled events for previous and subsequent years:

Input (queried_data, queried_dates, YoYSeasonality=TRUE)

Output (metric_data, historic_size, metric_dataref, matchingperiod, matchingspecialdays)

In this algorithm, queried_data represents the input usage data queried in an analytics software program, such as Adobe Analytics™, queried_dates represents the dates of the input usage data, and YoYSeasonality indicates a characteristic of the time interval in which the data experiences regular and predictable changes that recur each calendar year. Further, metric_data represents data specific to the metric based on the queried_data; metric_dataref represents the historical usage data during the time interval for the metric and includes data for all matchingspecialdays; matchingperiod represents is a vector of the same length as metric_data; and matchingspecialdays is a 2×k matrix where k is the number of scheduled events (e.g., holidays during the metric_data time interval). For instance, matchingspecialdays [1, i] is the index of the $i^{th}$ scheduled event during the input time interval and matchingspecialdays [2, i] is the index of the $i^{th}$ scheduled event during the historical time period.

In the above algorithm, historic_size is a specified value for the time series model used by the algorithm In one example, a default value of 35 days can be used for historic_size when days are being analyzed by the algorithm. In another example, a default value of two weeks can be used for historic_size when hours are being analyzed by the algorithm. If a user wants to analyze data from Nov. 1, 2014 to Dec. 31, 2014 for anomalies, then the algorithm will require data from Sep. 27, 2014 to Dec. 31, 2014 when the historic_size is 35, along with data from Sep. 27, 2014 to Dec. 31, 2014 from a historic time interval. The described outputs of the above algorithm are used in the following second portion of the algorithm as follows:

Input (metric_data, historic_size, metric_dataref matchingperiod, matchingspecialdays, confidence)

Output (model, fitted, lower_bound, upper_bound)

In this algorithm, confidence represents a number or percentage of false anomalies that are acceptable. For example, a 95% confidence suggests that the algorithm will show anomalies in 5% of cases where there were previously zero anomalies. This input can assist a user in determining the number of false anomalies generated by the algorithm Some false anomalies may be allowed in the algorithm using the confidence variable, otherwise the system will not flag any data as an anomaly regardless of the value of the data. In the output, a model is generated by fitting the input usage data to the historical usage data using the described techniques, and the lower_bound and upper_bound are used as thresholds for determinations of anomalies.

To analyze metric_data for anomalies, first the above anomaly detection algorithm is run on the data from the historical time interval. A number of days n is checked before and after a scheduled event to determine if any of the n days contain data that deviates from typical behavior for the metric. Any days that deviate from typical behavior for the metric within n days of the scheduled event are assigned a set of indices t_ref.

Then, the above anomaly detection algorithm is run on the data from the input time interval. The data from days that were assigned the indices t_ref are checked against the data from corresponding days in the input time interval. Days in the input time interval that have values anomalous to the days that were assigned indices in t_ref are assigned a set of indices t_current. The t_current indices are the days that show a significant effect by the scheduled event in the input time interval.

A model can be generated based on expected values for days in the input time interval. To model the expected value at a particular time $ye_t$, the expected value for the particular day t in t_current is a combination of the expected value for the input time interval and the effect on the metric in the historical time interval. A correction for the effect of the scheduled event, and the year-over-year seasonality, can be applied using any of the following techniques, and the best model can be chosen based on a lowest value of the mean absolute percentage error (MAPE) for each of the different corrections:

Additive effect: correction for the effect of the scheduled event and the year-over-year seasonality is found by $y_t = ye_t + yh_{t2}$ where $yh_{t2}$ is the effect of the scheduled event from the historical time period, and t2 is the index of the same scheduled event from the historical time period.

Multiplicative effect: correction for the effect of the scheduled event and the year-over-year seasonality is found by $$y_t = ye_t \times \left(1 + \frac{yh_{t2}}{ye_{t2}}\right)$$

where $yh_{t2}$ is the effect of the scheduled event from the historical time period, $ye_{t2}$ is the expected value of the metric during the corresponding date in the historical time period, and t2 is the index of the same scheduled event from the historical time period.

Year-over-Year difference: correction for the effect of the scheduled event and the year-over-year seasonality is found by $dy_t = y_t - y_{t1} - (yh_t - yh_{t2})$ where $y_{t1}$ is is the value of the metric on the corresponding date during the historical time period, t1 is corresponding date during the historical time period, $yh_{t2}$ is the effect of the scheduled event from the historical time period, and t2 is the index of the same scheduled event from the historical time period. The above anomaly detection module is then run on $dy_t$.

After applying the above algorithm and the correction, the data for the sales metric depicted at 302 is adjusted by date to accurately reflect the scheduled events during the input time interval and historical time interval, seen at the diagram 304. The algorithm aligns the scheduled events by incorporating contextual information about the scheduled events, thus more accurately identifying anomalies in the data. Where previous techniques would likely mistakenly alert users to anomalies in the data on Black Friday or Cyber Monday, the techniques described herein accurately account for the effect even though the events occur on different days from year to year and the effect does not occur on a scheduled holiday.

In doing so, the algorithm can locate days around a scheduled event where values for a metric significantly changed by using a publicly or privately available list of scheduled events rather than requiring a user to input specific dates that will be relevant for analysis. The techniques described herein reduce the cost of querying data by using only two time intervals—an input time interval and a historical time interval—rather than tracking data for numerous years to find trends. The cost of querying data is further reduced by the algorithm only needing to query data for the specific input time interval and a non-contiguous historical time interval. Additionally, the techniques described herein is capable of analyzing whether a scheduled event is relevant to the particular query, and ignores irrelevant scheduled events.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
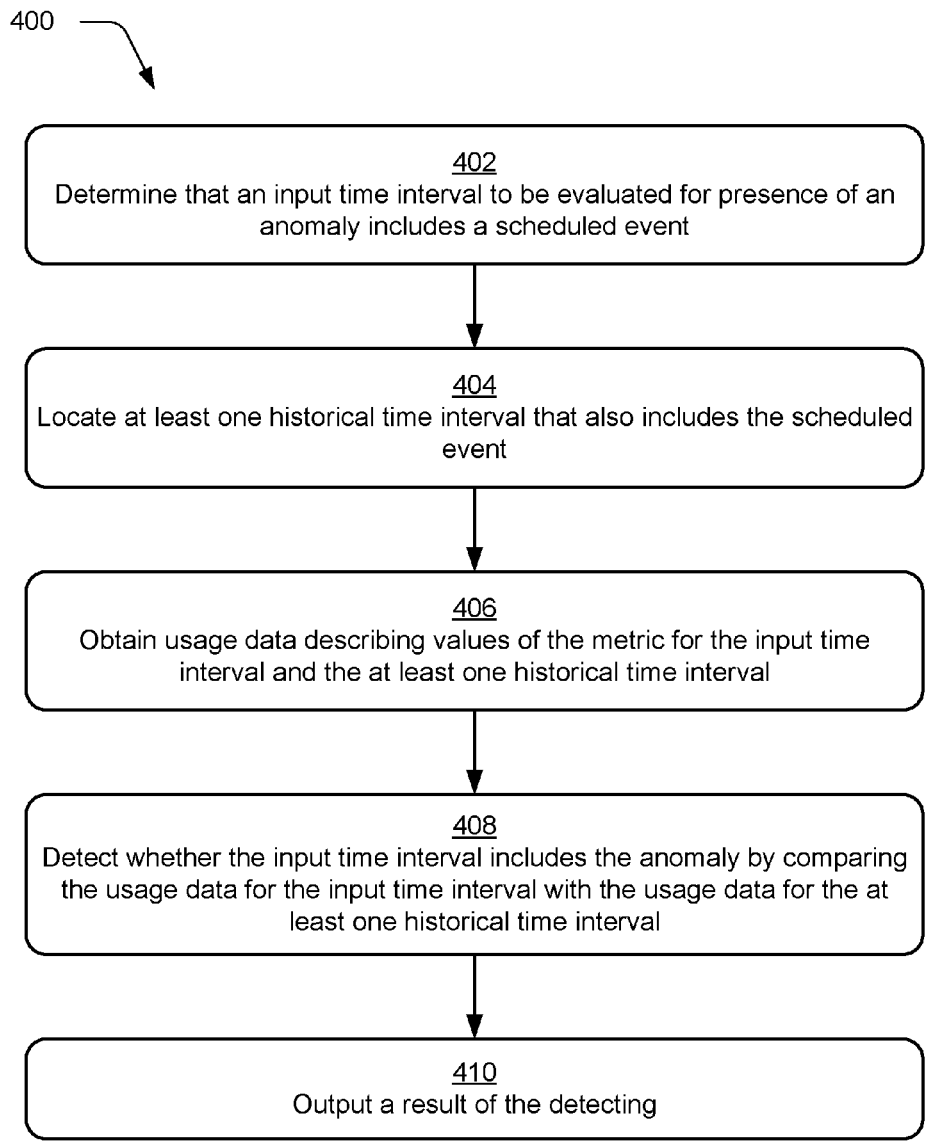
FIG. 4 is a flow diagram depicting a procedure in an example implementation in which anomalies of a metric involving provision of digital content by a service provider system are detected.

FIG. 4 depicts a procedure 400 in an example implementation in which an anomalies are detected for a metric involving provision of digital content by a service provider system. An input time interval is determined that includes a scheduled event. The input time interval is to be evaluated for the presence of an anomaly during the input time interval (block 402). The input time interval may be identified by monitoring user interaction with a user interface of the analytics system 106, obtained as a result of a search query, and so forth. The scheduled event module 210 identifies publicly-accessible scheduled events 212 such as holidays, and/or privately-accessible scheduled events 212 such as sales by the service provider as discussed above.

Then, at least one historical time interval is located that also includes the scheduled event (block 404). The historical time interval module 216 can identify an occurrence of the scheduled event 212 in a time interval that is not the same as the input time interval. Additionally, the historical time interval module 216 can select a historical time interval 218 that includes the scheduled event 212, but is not necessarily the same dates or times as the input time interval, as long as the historical time interval 218 includes the scheduled event 212.

Usage data is obtained describing values of the metric. The usage data describes both the input time interval and the at least one historical time interval (block 406). The usage data may be non-continuous between the input time interval and the historical time interval. The input usage data 202 can describe a subset of the usage data 116, with which, a user interacts via the user interface 228 and thus is identified automatically and without user intervention by the analytics system 106. The historical usage data 222, like the input usage data 202, describes a subset of the usage data 116 but corresponds to the determined historical time interval 218 that includes the scheduled event 212.

Then, the usage data for the input time interval is compared with the usage data for the at least one historical time interval to detect whether the input time interval includes the anomaly in the metric (block 408). The usage data comparison module 220 compares the input usage data 202 with the historical usage data 222 while taking into consideration the scheduled event 212. In one example, the scheduled event 212 occurs on the same date in the historical time interval 218 and the input time interval, and there is a deviation from typical behavior for the metric on the scheduled event 212 in both time intervals. In this example, the usage data comparison module 220 concludes that the deviation from typical behavior for the metric is a result of the scheduled event 212 and is not an anomaly. However, if there is a deviation from typical behavior for the metric on the scheduled event 212 in only one of the time intervals, then the usage data comparison module 220 concludes that this deviation is an anomaly.

In a second example, scheduled events 212 may not occur on the same date or at the same time in the input usage data 202 and the historical usage data 222. Rather than comparing the same dates as in the previous example, the usage data comparison module 220 compares data from the scheduled event 212 in the input time interval to data from the scheduled event 212 in the historical time interval 218. The usage data comparison module 220 can conclude whether there is an anomaly based on the comparison and whether there is a deviation from typical behavior for the metric during the scheduled event during one or both of the time intervals.

In a third example, scheduled events 212 may have an effect on time periods outside of the time of the scheduled event, causing deviations from typical behavior for a metric. Additionally, a scheduled event may not occur on the same date from one year to the next, so comparisons of dates from year to year will not yield accurate indications on whether data of metrics are anomalies or not. To account for these effects, the usage data comparison module 220 compares the historical usage data 222 surrounding the scheduled event 212 during the historical time interval 218 to the input usage data 202 surrounding the scheduled event. A predetermined time period can be used to limit the effect of the scheduled event to days or times surrounding the scheduled event.

The usage data comparison module 220 can conclude whether there is an anomaly based on the comparison and whether there is a deviation from typical behavior for the metric during the predetermined time period surrounding the scheduled event during one or both of the time intervals. The result of the comparisons is then output by the analytics system (block 410), e.g., for output in a user interface 228 by a user interface module 230, for use in initiating actions automatically and without user intervention (e.g., for computational resource provisioning, inventory control, and so on) by the service provider system 102, and so on.

Example System and Device

Figure 5:
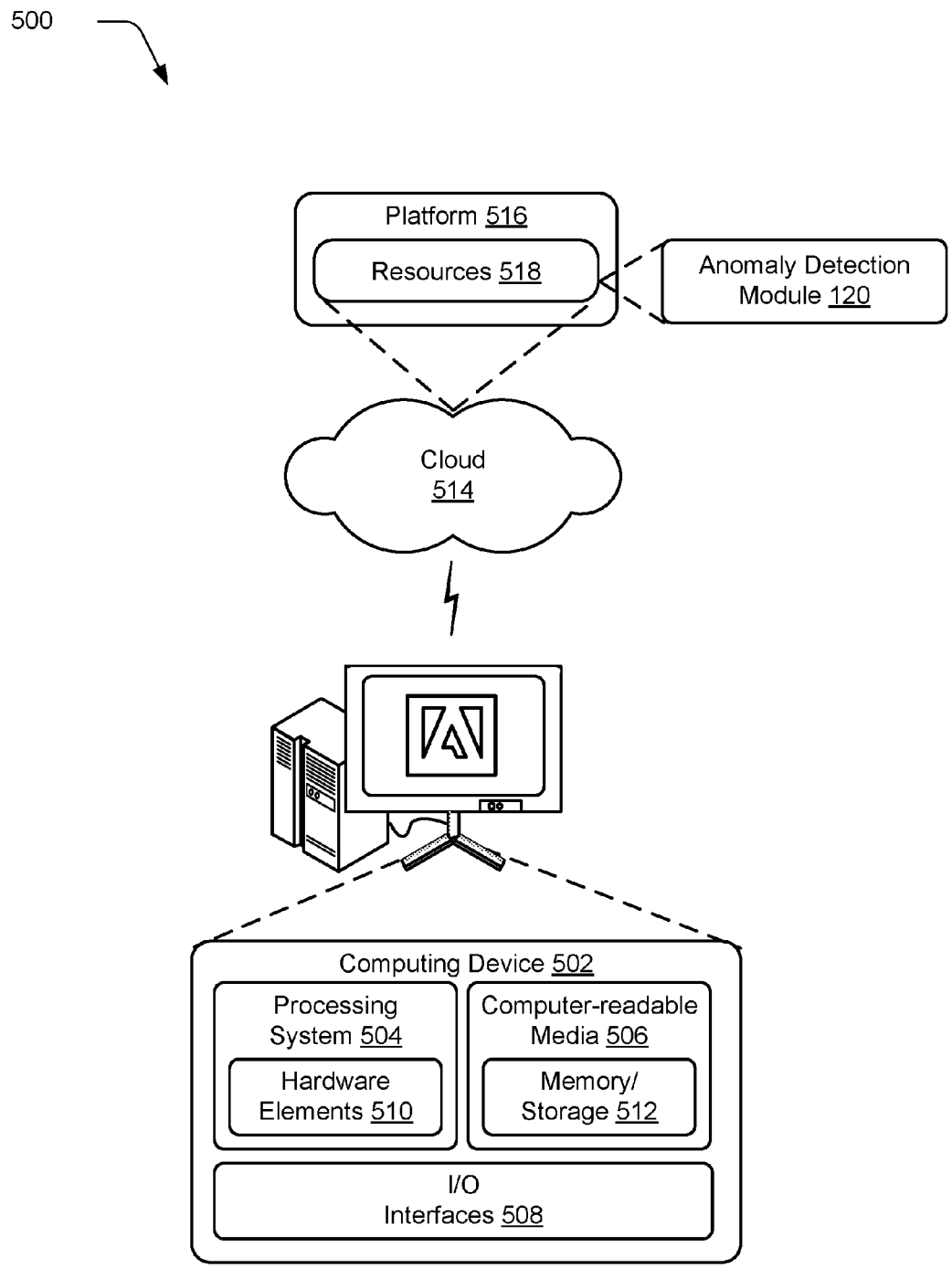
FIG. 5 illustrates an example system including various components of an example device that can be implemented as any type of computing device as described and/or utilize with reference to FIGS. 1-4 to implement embodiments of the techniques described herein.

FIG. 5 illustrates an example system generally at 500 that includes an example computing device 502 that is representative of one or more computing systems and/or devices that may implement the various techniques described herein. This is illustrated through inclusion of the anomaly detection module 120. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to detect the presence of an anomaly of a metric in provision of digital content by a service provider system, a method implemented by at least one computing device of an analytics system, the method comprising:
    determining, by the at least one computing device, that an input time interval to be evaluated for presence of the anomaly includes a scheduled event;
    locating, by the at least one computing device, at least one historical time interval that also includes the scheduled event;
    obtaining, by the at least one computing device, usage data describing values of the metric for the input time interval and the at least one historical time interval;
    detecting, by the at least one computing device, whether the input time interval includes the anomaly by comparing the usage data for the input time interval within a predetermined time period surrounding the scheduled event in the input time interval with the usage data for the at least one historical time interval within the predetermined time period surrounding the scheduled event in the historical time interval; and
    outputting, by the at least one computing device, a result of the detecting.

2. The method as described in claim 1, wherein the scheduled event in the input time interval is identified from a publicly accessible calendar.

3. The method as described in claim 1, wherein the input time interval and the historical time interval have a different start time and a different end time.

4. The method as described in claim 1, wherein the detecting indicates that the usage data for the input time interval includes the anomaly of the metric during the scheduled event.

5. The method as described in claim 4, wherein the detecting is based on comparing the usage data for the input time interval during the scheduled event to the usage data for the at least one historical time interval during the scheduled event.

6. The method as described in claim 1, wherein the usage data for the input time interval includes the anomaly of the metric within the predetermined time period surrounding the scheduled event.

7. The method as described in claim 6, further comprising determining that the anomaly of the metric is within the predetermined time period surrounding the scheduled event by said comparing.

8. The method as described in claim 1, wherein the usage data for the input time interval and the usage data for the historical time interval are disjoint sets, one to another.

9. The method as described in claim 1, further comprising applying a correction for an effect of the scheduled event, the correction comprising an additive effect, a multiplicative effect, or a year-over-year difference.

10. The method as described in claim 9, wherein the correction is selected from the additive effect, the multiplicative effect, and the year-over-year difference based on a lowest value of a mean absolute percentage error (MAPE) for each of the different corrections.

11. In a digital medium environment to detect the presence of an anomaly of a metric in provision of digital content by a service provider system, a system comprising:
    a potential anomaly detection module implemented at least partially in hardware of a computing device to detect a potential anomaly in an input time interval;
    an anomaly verification module implemented at least partially in hardware of the computing device to verify that the potential anomaly is the anomaly in the input time interval by:
        a scheduled event module to determine that the input time interval includes a scheduled event;
        a historical time interval module to locate at least one historical time interval that also includes the scheduled event; and
        a usage data comparison module to obtain usage data describing values of the metric for the input time interval and the at least one historical time interval, and compare the usage data for the input time interval within a predetermined time period surrounding the scheduled event with the usage data for the at least one historical time interval within the predetermined time period surrounding the scheduled event; and
    an anomaly output module implemented at least partially in hardware of the computing device to output a result of the anomaly verification module.

12. The system as described in claim 11, wherein the potential anomaly represents a behavioral deviation for the metric during the scheduled event in the usage data for the input time interval.

13. The system as described in claim 12, wherein the anomaly verification module is further configured to determine that the potential anomaly is the anomaly by comparing the usage data for the input time interval during the scheduled event to the usage data for the at least one historical time interval during the scheduled event.

14. The system as described in claim 11, wherein the potential anomaly is represented by a deviation from typical behavior for the metric within the predetermined time period surrounding the scheduled event in the usage data for the input time interval.

15. The system as described in claim 14, wherein the anomaly verification module is further configured to determine that the potential anomaly is the anomaly by said comparing.

16. The system as described in claim 11, wherein usage data for the input time interval and the usage data for the historical time interval are disjoint sets.

17. In a digital medium environment to detect the presence of an anomaly of a metric of a service provider system involving provision of digital content, a system comprising:
    means for identifying an input time interval to be evaluated for presence of the anomaly;
    means for identifying inclusion of a scheduled event in the input time interval;
    means for determining at least one historical time interval that includes the scheduled event in the input time interval;
    means for obtaining usage data describing values of the metric for the input time interval and the at least one historical time interval; and
    means for detecting whether the input time interval includes the anomaly in the metric by comparing the usage data for the input time interval within a predetermined time period surrounding the scheduled event in the input time interval with the usage data for the at least one historical time interval within the predetermined time period surrounding the scheduled event in the historical time interval.

18. The system as described in claim 17, wherein the scheduled event in the input time interval is identified from a publicly accessible calendar.

19. The system as described in claim 17, wherein the usage data for the input time interval and the usage data for the historical time interval are disjoint sets.

20. The system as described in claim 17, further comprising means for applying a correction for an effect of the scheduled event, the correction comprising an additive effect, a multiplicative effect, or a year-over-year difference, wherein the correction is selected from the additive effect, the multiplicative effect, and the year-over-year difference based on a lowest value of a mean absolute percentage error (MAPE) for each of the different corrections.

* * * * *